(12) United States Patent
Rahman

(10) Patent No.: US 11,304,101 B2
(45) Date of Patent: Apr. 12, 2022

(54) MANAGING DELIVERY OF RTP-BASED WIRELESS TELECOMMUNICATIONS SERVICES

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/916,131

(22) Filed: Mar. 8, 2018

(65) Prior Publication Data

US 2019/0281513 A1    Sep. 12, 2019

(51) Int. Cl.
*H04W 36/00* (2009.01)
*H04L 29/06* (2006.01)
*H04L 65/65* (2022.01)

(52) U.S. Cl.
CPC ....... *H04W 36/0083* (2013.01); *H04L 65/608* (2013.01)

(58) Field of Classification Search
None
See application file for complete search history.

(56) References Cited

U.S. PATENT DOCUMENTS

| | | | | |
|---|---|---|---|---|
| 6,993,359 B1* | 1/2006 | Nelakanti | ............ | H04W 36/14 455/426.1 |
| 9,220,045 B2* | 12/2015 | Singh | ................. | H04W 36/245 |
| 2006/0046661 A1* | 3/2006 | Ekvetchavit | ......... | H04W 36/14 455/67.11 |
| 2006/0098625 A1* | 5/2006 | King | ................ | H04L 29/06027 370/352 |
| 2008/0254802 A1* | 10/2008 | Ohta | ................ | H04W 36/0072 455/440 |
| 2011/0013599 A1* | 1/2011 | Shukla | ................... | H04W 36/30 370/332 |
| 2011/0222412 A1* | 9/2011 | Kompella | .............. | H04L 47/26 370/241.1 |

(Continued)

OTHER PUBLICATIONS

International Search Report and Written Opinion for International Application No. PCT/US2019/020806 dated May 28, 2019 in 17 pages.

*Primary Examiner* — Steve R Young
(74) *Attorney, Agent, or Firm* — Knobbe Martens Olson & Bear LLP

(57) ABSTRACT

Systems, methods, and computer-readable media are described for delivering wireless telecommunications services using the Voice over Long Term Evolution (VoLTE) protocol, the Video over Long Term Evolution (VoLTE) protocol, and other such protocols that implement the Real-Time Transport Protocol (RTP) to deliver packet flows to mobile devices. Metrics relating to the RTP packet flow may be generated, and may be collected from a mobile device periodically or on an as-needed basis. The RTP-based metrics may be utilized to determine that an LTE inter-frequency handover should be performed. Inter-frequency handover criteria may specify thresholds for RTP metrics within an individual reporting period, or may be used to determine that an inter-frequency handover will occur if a rolling or weighted average of RTP metrics satisfies a threshold.

20 Claims, 6 Drawing Sheets

(56) References Cited

U.S. PATENT DOCUMENTS

| | | |
|---|---|---|
| 2013/0329591 A1 | 12/2013 | Osborn |
| 2015/0201360 A1* | 7/2015 | Ray Chaudhuri .... H04W 36/30 455/436 |
| 2015/0365865 A1 | 12/2015 | Belschner et al. |
| 2016/0119384 A1 | 4/2016 | Karimli et al. |
| 2016/0234749 A1 | 8/2016 | Singh et al. |
| 2017/0094563 A1* | 3/2017 | Yang ................ H04W 36/0005 |
| 2017/0181048 A1* | 6/2017 | Shah ................ H04L 65/1083 |
| 2019/0045578 A1* | 2/2019 | Oyman ................ H04L 65/607 |
| 2019/0268819 A1* | 8/2019 | Kim ................ H04W 72/04 |

* cited by examiner

MANAGING DELIVERY OF RTP-BASED WIRELESS TELECOMMUNICATIONS SERVICES

BACKGROUND

Generally described, computing devices can be used to exchange information via a network. For example, mobile computing devices may utilize a network provided by a wireless service provider to facilitate the exchange of information in accordance with one or more wireless communication protocols. For example, a wireless service provider may maintain a wireless network that enables mobile computing devices to exchange information in accordance with a fourth-generation wireless telecommunications protocol, such as the Long Term Evolution ("LTE") protocol.

A wireless service provider may further enable network communications via protocols that are based on the LTE protocol, and mobile computing devices may utilize these protocols to facilitate the exchange of information. For example, a wireless service provider may maintain a network of wired and wireless components that implement the Voice over LTE ("VoLTE") protocol, enabling mobile computing devices to send and receive voice communications using packet-based Internet Protocol ("IP") networking rather than traditional circuit-based networking. As a further example, a wireless service provider may maintain a network of wired and wireless components that implement the Video over LTE ("ViLTE") protocol, enabling mobile computing devices to send and receive video communications using packet-based Internet Protocol ("IP") networking.

Various nodes within the wireless service provider's network may communicate using various protocols in order to implement VoLTE and/or ViLTE services and functionality. For example, mobile computing devices and one or more fixed-location transceivers, which may be known as enhanced Node Bs ("eNBs"), may communicate using the Real-Time Transport Protocol (RTP) to in order to implement VoLTE or ViLTE services.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
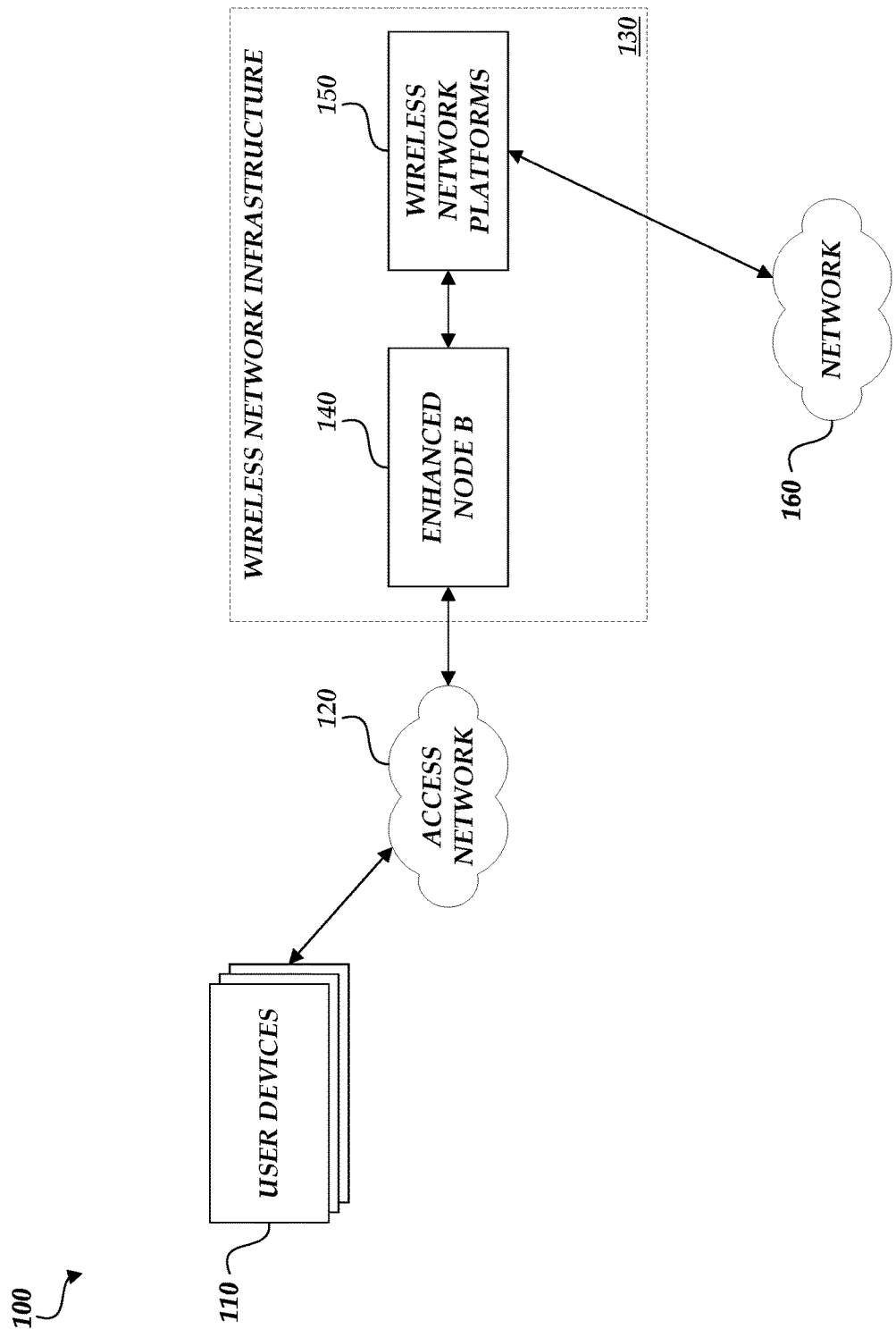
FIG. 1 is a block diagram of an example network environment that provides wireless telecommunications services in accordance with the VoLTE protocol.

Generally described, aspects of the present disclosure relate to wireless telecommunications. More specifically, aspects of the present disclosure are directed to systems, methods, and computer-readable media related to delivery of wireless telecommunications services through the use of RTP-based metrics. Illustratively, a wireless service provider may facilitate communications between a first party using a mobile computing device (referred to herein as a "user device" or "user equipment") and a second party or parties, who may be using mobile computing devices, telecommunications devices, or other computing devices. The wireless service provider may facilitate these communications by providing a wireless telecommunications network, which may include various network elements. The wireless telecommunications network may implement protocols such as VoLTE or ViLTE by facilitating transmission and receipt of packet data flows between the user device, the network elements, and the other party or parties to the call.

The wireless service provider may monitor performance of its network by collecting various service measurements and relating them to the performance of various network elements. For example, the wireless service provider may collect service measurements that indicate the strength and quality of radio signals received by a user device, such as a Reference Signal Received Power ("RSRP") measurement or a Reference Signal Received Quality ("RSRQ") measurement. These measurements may indicate how "loudly" and "clearly" the user device receives signals from the wireless service provider's network. The service measurements may vary due to factors such as movement of the user device, traffic density (e.g., the number of other user devices nearby), environmental conditions, network performance issues, and other factors. For example, network congestion in a particular area may cause RSRQ measurements in that area to be lower.

The user device may report these service measurements to an eNB of the wireless service provider. The eNB may in turn determine, for example, that one or more of these metrics is below a threshold. The eNB may therefore instruct the user device to communicate via a different eNB in the wireless telecommunications network, using the same radio frequencies (an "intra-frequency handover"), or to change the radio frequencies it is using to communicate with the eNB (an "inter-frequency handover"). For example, a user device may periodically report RSRP measurements to the eNB. The eNB may determine that one or more of the RSRP measurements has fallen below a threshold (which may indicate that the user device is moving away from the eNB), and may therefore instruct the user device to switch to a different eNB.

Generally described, however, service measurements that indicate the strength and quality of radio signals may be inadequate to detect issues relating to the delivery of RTP packet flows. For example, various issues (such as intermittent latency, packet network congestion, router hardware and software issues, and the like) may cause packets to be dropped, delayed, or delivered out of sequence, and these issues may do so without affecting the measurements that indicate the strength and quality of radio signals. Such issues, which may be referred to herein as "RTP-based degradations," may cause user-perceivable degradations in audio or video when using RTP-based protocols such as VoLTE or ViLTE. In some aspects, RTP-based degradations may be reduced or eliminated by performing an inter-frequency handover. For example, radio signals at a particular frequency may "bounce" or be reflected by various objects and/or atmospheric conditions in the vicinity of the user. The RTP packets may thus arrive at the user device out of order or with significant delays between packet arrivals.

The user device may thus be better served by using a different frequency that could allow the signal to pass through the nearby objects. However, because RTP-based degradations are typically not identifiable in measurements that indicate the strength and quality of radio signals, an eNB that relies solely on radio signal measurements to determine whether and when to perform inter-frequency handovers will not be able to mitigate RTP-based degradation.

To improve the functionality of the wireless telecommunications network, the wireless service provider may therefore implement RTP-based service measurements, referred to herein as "RTP metrics," and may implement handover criteria based on these metrics. The wireless service provider may instruct user devices to collect and report RTP metrics, and may determine whether these metrics satisfy RTP-based handover criteria. The wireless service provider may further determine that an inter-frequency handoff should be performed based on whether the collected RTP metrics satisfy the criteria.

Although described herein with reference to VoLTE and/or ViLTE, it will be understood that the present disclosure is not limited to any particular protocol or protocols. It will further be understood that example embodiments described herein may refer to a particular protocol, such as VoLTE, for purposes of clarity of illustration. Such references do not indicate that the embodiments of the present disclosure are limited to a particular protocol.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1 is a block diagram of an example network environment 100 for providing VoLTE and/or ViLTE services in accordance with aspects of the present disclosure. The network environment 100 may include a number of user devices 110, each of which may be associated with the user. The user devices 110 may correspond to a wide variety of devices or components that are capable of initiating, receiving, or facilitating communications over a communication network in accordance with LTE-based protocols that use RTP packet flows. For example, the user devices 110 may include personal computing devices, electronic book readers (e.g., e-book readers), handheld computing devices, integrated components for inclusion in computing devices, home electronics, appliances, vehicles, machinery, landline telephones, network-based telephones (e.g., VoIP phones), cordless telephones, cellular telephones, smartphones, modems, personal digital assistants, laptop computers, gaming devices, media devices, and the like. In an illustrative embodiment, the user devices 110 include a wide variety of software and hardware components for establishing communications over one or more communication networks, including one or more access networks 120 or other private or public networks such as network 160.

The user devices 110 may be communicatively connected to wireless network infrastructure 130 via the access network 120. Illustratively, the access network 120 may be an Evolved Universal Terrestrial Radio Access (E-UTRAN) network. In some embodiments, the access network 120 is distributed over land areas, each of which is served by at least one fixed-location transceiver known as an enhanced Node B ("eNB") 140. As used herein, the term "cell" may refer interchangeably to an eNB 140 itself or to the land area served by an eNB 140. The eNB 140 includes radio transceivers that provide the cell with network coverage, and which can be used for transmission of voice, messages, or other data. An eNB 140 may use a different set of frequencies from neighboring cells, to avoid interference and provide guaranteed service quality within each cell. When joined together, the eNBs 140 provide radio coverage over a wide geographic area. This enables a large number of user devices 110 to communicate via the fixed-location transceivers. Although the access network 120 is illustrated as a single network in FIG. 1, one skilled in the relevant art will appreciate that the access network may include any number of public or private communication networks and/or network connections. Further, although a single eNB 140 is depicted in FIG. 1, one skilled in the relevant art will understand that the access network 120 may include multiple eNBs 140.

In addition to one or more eNBs 140, the wireless network infrastructure 130 may include any number of wireless network platforms 150, which may enable communication between the eNBs 140 and external networks such as the network 160. Examples of wireless network platforms 150 include mobility management entities, a policy charging and rules functions, components of an IP multimedia system, other gateways, and so forth. It will further be understood that, in various embodiments, the eNB 140 may be in communication with the network 160 directly or indirectly. Collectively, the wireless network infrastructure 130 may comprise all or part of a wireless telecommunications network, as described above.

The network 160 may illustratively be any wired or wireless network, including but not limited to the access network 120, the Public Switched Telephone Network ("PSTN"), another wireless telecommunications network, the Internet, a Wi-Fi network, a satellite network, a mesh network, a public or private intranet, or any combination thereof.

It will be understood that the network environment 100 may include more (or fewer) elements than those shown in FIG. 1. It is not necessary, however, that all of these elements be shown in order to provide an enabling disclosure.

Figure 2:
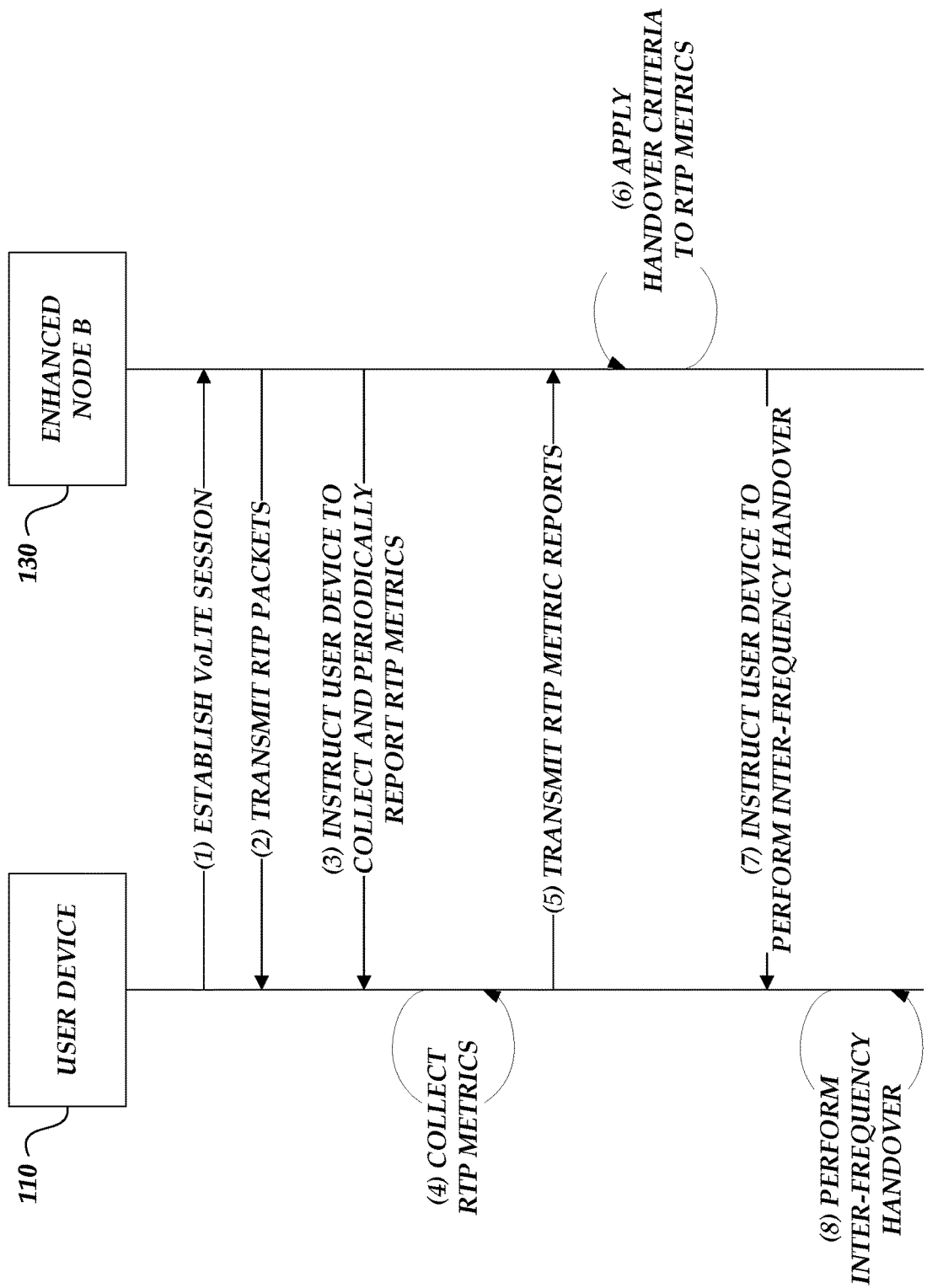
FIG. 2 is a block diagram depicting example interactions for collecting and processing RTP metrics during a VoLTE call, in accordance with aspects of the present disclosure.

FIG. 2 is a block diagram depicting example interactions for collecting and processing RTP metrics during a VoLTE call, in accordance with aspects of the present disclosure. In the illustrated embodiment, at (1), the user device 110 establishes a VoLTE session with an eNB 140. In other embodiments, the user device 110 may establish a ViLTE session, or may communicate with the eNB 140 via another protocol that uses RTP packet flows. At (2), the eNB 140 transmits RTP packets to the user device 110 in accordance with the communications protocol.

At (3), the eNB 140 may instruct the user device 110 to collect and periodically report RTP metrics. In various embodiments, the eNB 140 may instruct the user device 110 to collect a predefined set of metrics, collect a particular predefined metric, or may send instructions or parameters that define the metrics to be collected. The RTP metrics may generally include measurements of packet loss, latency, and other characteristics of packet data flows. For example, as described in more detail below, the eNB 140 may instruct the user device 110 to collect and report the number of packets within each 500 ms interval that were received out of sequence. As further examples, the eNB 140 may instruct the user device 110 to collect and report the largest gap between packet numbers for each interval, the longest time duration between arriving packets, and other such measurements. In some embodiments, the eNB 140 may instruct the user device 110 to periodically indicate whether a threshold was exceeded in the previous time interval. For example, the user device 110 may report as to whether more than 50 packets arrived out of sequence in a specified time interval, rather than reporting the number of packets that arrived out of sequence.

In some embodiments, the eNB 140 may instruct the user device to collect both RTP metrics and non-RTP metrics such as service measurements related to signal strength. In other embodiments, the eNB 140 may instruct the user device 110 to periodically collect RTP metrics, but report them only if a threshold is exceeded or a criterion is satisfied. For example, the eNB 140 may instruct the user device 110 to report if it has not received any RTP packets in the past 50 milliseconds, or if a threshold number or percentage of the RTP packets received in the past 100 milliseconds were out of sequence.

At (4), the user device 110 may collect the requested RTP metrics, as described in more detail below with reference to FIGS. 3A and 3B. In various embodiments, the user device 110 may include software, hardware, or combinations thereof that collect the requested RTP metrics. For example, the user device 110 may include a software application or agent that collects and reports non-RTP metrics, which can also be instructed to collect RTP metrics. At (5), the user device 110 may transmit RTP metric reports to the eNB 140. In various embodiments, the RTP metric reports may be transmitted on a periodic basis, an as-needed basis, or according to various criteria.

At (6), as described in more detail below with reference to FIG. 4, the eNB 140 may obtain and apply LTE inter-frequency handover criteria to the received RTP metrics. For example, the eNB 140 may obtain handover criteria indicating that an LTE inter-frequency handover should be triggered if no RTP packets are received for more than a specified interval (e.g., 200 milliseconds). As further examples, the eNB 140 may obtain criteria indicating a threshold number of out-of-sequence packets, the maximum size of the gap between packet sequence numbers, and so forth. The eNB 140 may apply the obtained handover criteria and, in some embodiments, may determine that an inter-frequency handover should be performed. For example, the eNB 140 may obtain a criterion indicating that an inter-frequency handover should be performed if 75 packets are received out of sequence within a specified measurement interval. The eNB 140 may then compare this threshold to an RTP metric received from the user device 110 which indicates that 92 packets were received out of sequence within the most recent measurement interval. The eNB 140 may therefore determine that the criterion has been satisfied and an inter-frequency handover should be performed.

If so, then at (7) the eNB 140 may instruct the user device 110 to perform the inter-frequency handover. In some embodiments, the eNB 140 may perform other actions in conjunction with sending the instruction to the user device 110 to perform an inter-frequency handover. For example, the eNB 140 may determine whether another frequency is available, reserve resources associated with the new frequency, release resources associated with the current frequency, and so forth. In further embodiments, the eNB 140 may only instruct the user device 110 to perform an inter-frequency handover if other criteria are satisfied. For example, to prevent a "ping-pong" condition (in which the user device 110 repeatedly switches back and forth between two frequencies), the eNB 140 may only instruct the user device 110 to perform an inter-frequency handover if the user device 110 has not already performed one within a specified interval.

At (8), the user device 110 may perform the inter-frequency handover. In some embodiments, the user device 110 may then collect and report RTP metrics as it communicates using the new frequency, and the interactions at (4), (5), and (6) may be carried out periodically for the duration of the VoLTE session. In further embodiments, the interactions at (7) and (8) may be carried out again if and when the RTP metrics on the new frequency indicate that another inter-frequency handover should occur.

It will be understood that the interactions depicted in FIG. 2 are provided for purposes of example, and that embodiments with more, fewer, different, or different orderings of interactions are within the scope of the present disclosure. For example, the interaction at (3) may precede one or both of the interactions at (2) and (1). As a further example, in some embodiments, the interaction at (3) may be omitted, and the user device 110 may collect RTP metrics without receiving a separate request to do so from the eNB 140. The interactions depicted in FIG. 2 are thus understood to be illustrative and not limiting.

Figure 3A:
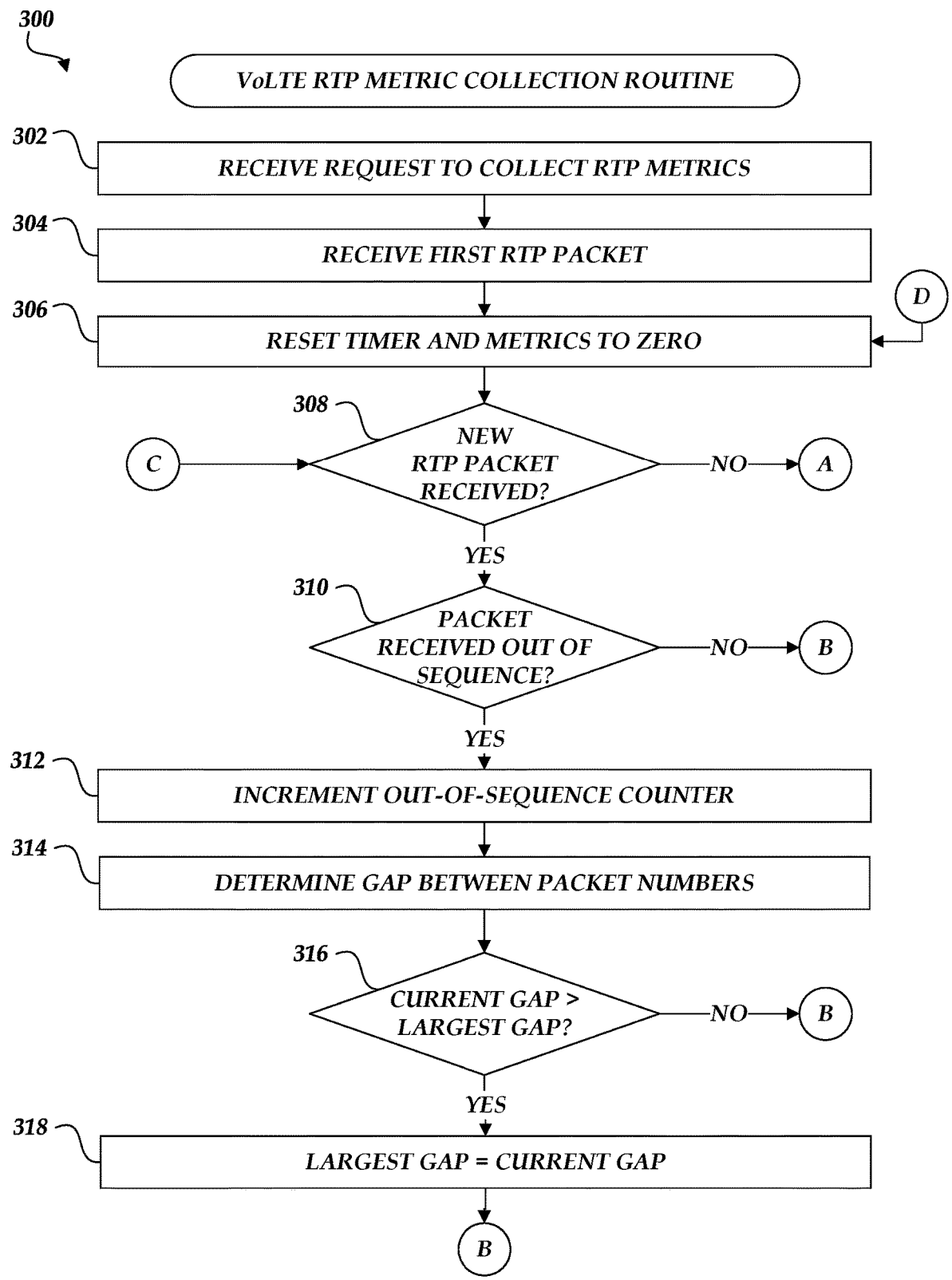
FIGS. 3A and 3B are flow diagrams depicting an example VoLTE RTP metric collection routine that is illustratively implemented in the network environment of FIG. 1.
Figure 3B:
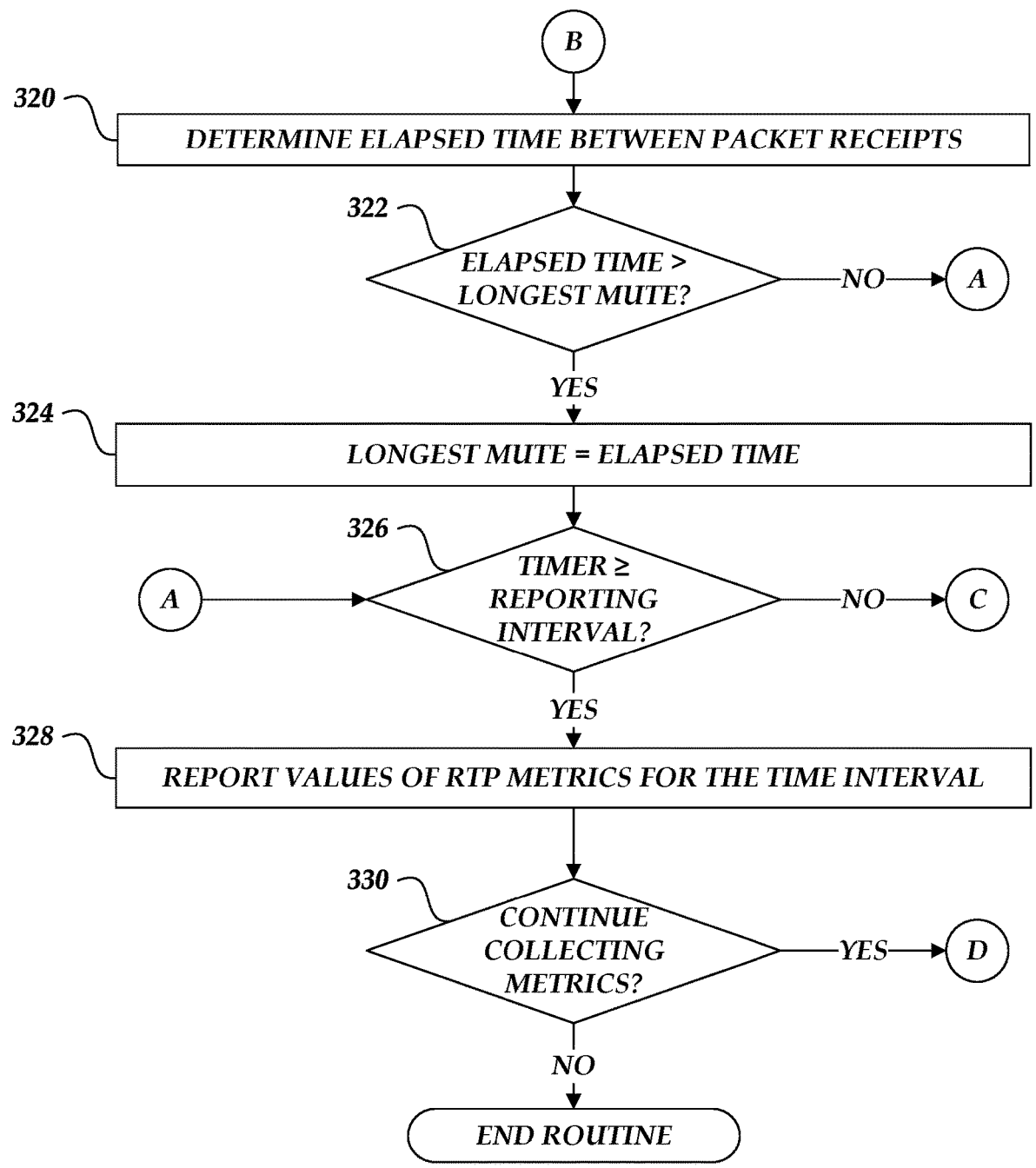

FIGS. 3A and 3B are flow diagrams depicting an example VoLTE RTP metric collection routine 300. The routine 300 may be carried out, for example, by the user device 110 of FIG. 1, and may include some or all of the interactions depicted in FIG. 2. In some embodiments, all or part of the routine 300 may be carried out by another computing device, such as the eNB 140 or a different wireless network platform 150.

At block 302, a request to collect RTP metrics for a particular VoLTE session may be received. Illustratively, as described above, the request to collect RTP metrics may be part of a larger request to collect RTP and non-RTP metrics generally for the VoLTE session, or a specific request to collect RTP metrics may be generated before or during the establishment of the VoLTE session. In some embodiments, block 302 may be omitted. At block 304 a first RTP packet may be received, which may represent the start of the VoLTE session and may provide a reference point for comparison with further RTP packets.

At block 306, an interval timer and any metric counters are reset to zero. Illustratively, the execution of block 306 may mark the end of a previous RTP metric reporting interval (if there is one) and the start of a new RTP metric reporting interval.

At decision block 308 a determination may be made as to whether a new RTP packet has been received. If the determination is that a new RTP packet has been received, then at decision block 310 a determination is made as to whether the new RTP packet is out of sequence. Illustratively, the sequence number of the new RTP packet may be compared to a sequence number of a previous RTP packet (e.g., the last RTP packet to be received, if any, before the arrival of the new packet), and the new RTP packet may be considered to be out of sequence if its sequence number is not one higher than the previous packet. In some embodiments, the sequence number of the new RTP packet may be compared to an expected sequence number, which may be determined based on one or more previously received RTP packets.

If the determination at decision block 310 is that the new packet has been received out of sequence, then at block 312 an out-of-sequence counter may be incremented. At block 314, a gap between the sequence numbers of the new packet and the previous packet may be determined. For example, if the sequence number of the new RTP packet is 65, and the sequence number of the previous RTP packet is 61, then the gap between the sequence numbers may be determined to be 4.

At decision block 316 a determination may be made as to whether the gap determined at block 314 is the largest gap that has been determined during the current reporting interval. If so, then at block 318 the gap determined at block 314 is stored as an RTP metric. The routine 300 then continues at block 320, as described below with reference to FIG. 3B.

If the determination at decision block 310 is that the packet was not received out of sequence, or if the determination at decision block 316 is that the gap determined at block 314 is not the largest gap determined in this reporting interval, then the routine 300 branches to block 320. If the determination at decision block 308 is that an RTP packet has not been received, then the routine 300 branches to decision block 326.

Turning now to FIG. 3B, at block 320 an elapsed time between packet receipts is determined. In some embodiments, the elapsed time between packet receipts may be determined by subtracting the time at which the previous RTP packet was received from the time at which the new RTP packet was received. In other embodiments, the elapsed time between packet receipts may be determined by comparing the time at which the previous RTP packet was received to the present time. For example, the determination may be that the previous RTP packet was received 19 ms ago.

At decision block 322, a determination may be made as to whether the elapsed time determined at block 320 is the longest elapsed time determined in this reporting interval. If so, then at block 324 the elapsed time is stored as a longest elapsed time RTP metric. If not, then the routine 300 continues at decision block 326, where a determination may be made as to whether the end of the current reporting interval has been reached. If not, then the routine 300 returns to decision block 308, and iterates until the end of the current reporting interval.

If the determination at decision block 326 is that the end of the current reporting interval has been reached, then at block 328 the values of the collected RTP metrics may be reported. A determination may then be made at decision block 330 as to whether RTP metric collection should continue. Illustratively, the determination at decision block 330 may be as to whether the VoLTE session identified at block 302 has terminated, or as to whether a request to stop collecting RTP metrics has been received. If the determination is that RTP metric collection should continue, then the routine 300 branches to block 306, where the timer and RTP metrics may be reset for a new reporting interval. If the determination is that RTP metric collection should not continue, then the routine 300 ends.

It will be understood that, in some embodiments, the determinations made at decision block 310, block 314, and block 320 may be made by comparing the new RTP packet to an RTP packet that was received in a previous reporting interval. It will further be understood that the illustrated routine 300 is provided for purposes of example, and that numerous variations on the routine 300 are within the scope of the present disclosure. For example, blocks 320-324 may be carried out prior to blocks 310-318. As a further example, block 314 may be carried out prior to decision block 310. Still further, blocks of the routine 300 may be omitted, combined, or carried out in other orders. The routine 300 is thus understood to be illustrative and not limiting.

Figure 4:
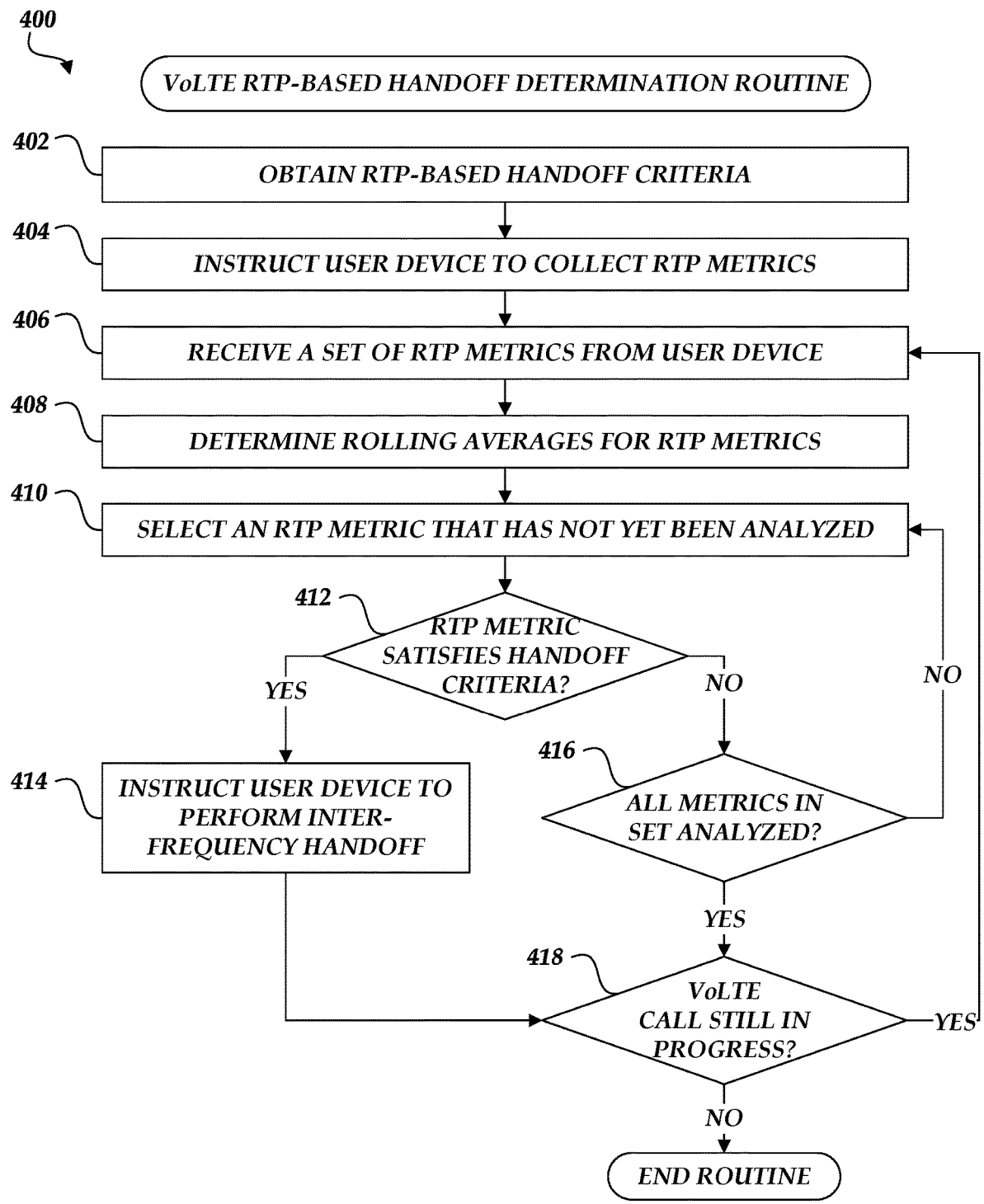
FIG. 4 is a flow diagram depicting an example VoLTE RTP-based handoff determination routine that is illustratively implemented in the network environment of FIG. 1.

FIG. 4 is a flow diagram depicting an example VoLTE RTP-based handoff determination routine 400. The routine 400 may be carried out in whole or in part, for example, by the eNB 140 of FIG. 1, the computing device 500 of FIG. 5, or another computing device. At block 402, RTP-based handoff criteria may be obtained. Illustratively, the RTP-based handoff criteria may indicate that an inter-frequency handover should occur if an RTP-based metric exceeds or falls below a threshold, falls within or outside a range, or other such criteria. In various embodiments, the RTP-based handoff criteria may be expressed in terms of numbers, percentages, categories, or other values. In further embodiments, the RTP-based handoff criteria may indicate that an inter-frequency handover should occur if multiple RTP-based metrics satisfy their respective criteria, if a particular RTP-based metric satisfies the criteria in a number of reporting intervals, or if a rolling or weighted average across a number of reporting intervals satisfies a criterion.

At block 404, a user device, such as a user device 110 of FIG. 1, may be instructed to collect and report RTP metrics. Illustratively, the user device may be instructed to carry out a routine for collecting and reporting RTP metrics, such as the example routine 300 depicted in FIGS. 3A and 3B. Thereafter, at block 406, a set of RTP metrics may be received from the user device. As described above, the set of RTP metrics may be associated with a reporting interval, such as a 500 ms window during which RTP packet flows are monitored and measured.

At block 408, in some embodiments, rolling or weighted averages for various RTP metrics may be determined. For example, the set of RTP metrics received at block 406 may be averaged with RTP metrics received in a previous iteration or iterations of block 406. In further embodiments, RTP metrics may be aggregated across multiple reporting intervals.

At block 410, an RTP metric that has not yet been analyzed may be selected. At decision block 412, a determination may then be made as to whether the selected RTP metric satisfies one or more of the RTP-based handoff criteria obtained at block 402. For example, a criterion may be obtained at block 402 that indicates an inter-frequency handoff should occur if more than 50 RTP packets are received out of sequence during a single reporting interval. An RTP metric may then be obtained at block 406 indicating that 27 RTP packets were received out of sequence during the most recent reporting interval. The determination at decision block 412 may therefore be that the RTP metric does not meet the handoff criteria.

In some embodiments, as described above, the determination of whether to trigger an inter-frequency handoff may be based on multiple RTP metrics that were collected in the same reporting interval. For example, the criteria may specify that an inter-frequency handoff should occur if no RTP packets are received for over 200 ms and the largest gap between packet sequence numbers exceeds 20. The determination at decision block 412 may therefore be whether the selected RTP metric completes a set of RTP metrics that collectively satisfy the criteria.

If the determination at decision block 412 is that the RTP metric satisfies the handoff criteria, then at block 414 the user device may be instructed to perform an inter-frequency handoff. As described above, the routine 400 may, in some embodiments, carry out other actions to implement the inter-frequency handoff, such as reserving or releasing resources within the wireless network infrastructure. If the determination at decision block 412 is instead that the RTP metric does not satisfy the handoff criteria, then at decision block 416 a determination is made as to whether all of the RTP metrics in the set have been analyzed. If not, then the routine 400 returns to block 410, and iterates until all of the RTP metrics have been analyzed.

Once all of the RTP metrics have been analyzed, or after the user device is instructed to perform an inter-frequency handoff, the routine 400 continues at decision block 418, where a determination may be made as to whether the associated VoLTE session is still in progress. If so, then the routine 400 branches to block 406, where another set of RTP metrics is received from the user device at the end of the next reporting interval. The routine 400 then iterates through blocks 408-418 until the VoLTE session ends.

It will be understood that the illustrated routine 400 is provided for purposes of example, and that numerous variations on the routine 400 are within the scope of the present disclosure. For example, block 402 may be carried out at any time prior to decision block 412. As a further example, decision block 418 may be carried out at any time after block 406. Still further, block 408 may be omitted or combined with decision block 412. The routine 400 is thus understood to be illustrative and not limiting.

Figure 5:
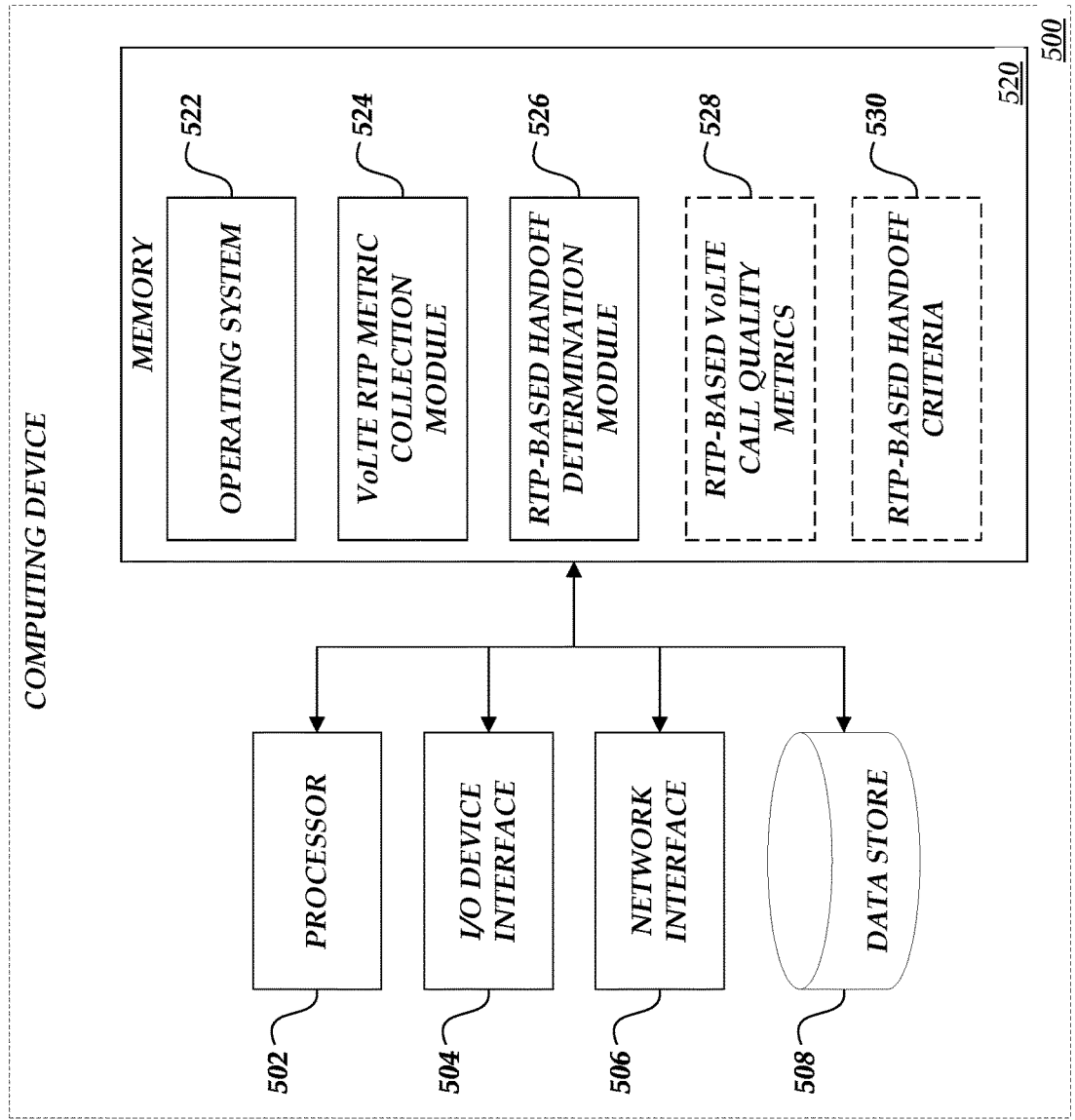
FIG. 5 is a functional block diagram of an example computing device for implementing VoLTE RTP-based metric collection and processing in the network environment of FIG. 1.

FIG. 5 is a functional block diagram of an example computing device 500 for implementing VoLTE RTP-based metric collection and processing in the network environment 100 of FIG. 1. The computing device 500 can be a server or other computing device. In various embodiments, the computing device 500 may comprise all or part of the eNB 140, all or part of the user device 110, all or part of the wireless network platforms 150, or various combinations thereof. The computing device 500 may include more (or fewer) components than those depicted in FIG. 5. It is not necessary, however, that all of these components be shown in order to provide an enabling disclosure.

In the illustrated embodiment, the computing device 500 comprises a processor 502, an I/O device interface 504, a network interface 506, a data store 508, and a memory 520, which may exchange information through a data bus. The network interface 506 can provide connectivity to one or more networks (e.g., the access network 120 or the network 160) or computing systems. The processor 502 can receive information and instructions from other computing systems or services via the network interface 506. The network interface 506 can also store data directly to the memory 520. The processor 502 can communicate to and from the memory 520 and output information via the I/O device interface 504. The I/O device interface 504 can accept input from various input devices, such as a keyboard, mouse, digital pen, microphone, mass storage device, etc. The data store 508 may generally be any non-transient computer-readable storage medium, including but not limited to hard disc drives, solid-state drives, magnetic media, optical media, tape drives, removable media, and the like.

The memory 520 contains computer program instructions that the processor 502 executes in order to implement one or more embodiments. The memory 520 generally includes RAM, ROM, and/or other persistent, non-transitory computer readable media. The memory 520 may store an operating system 522 that provides computer program instructions for use by the processor 502 or other elements included in the computing device in the general administration and operation of the computing device 500. The memory 520 may further include computer program instructions and other information for implementing aspects of the present disclosure. For example, in one embodiment, the memory 520 includes a VoLTE RTP metric collection module 524 and an RTP-based handoff determination module 526 that implement aspects of the present disclosure. The VoLTE RTP metric collection module 524 and the RTP-based handoff determination module 526 may illustratively correspond to all or some of the components depicted in FIG. 1, and may implement part or all of the illustrative routines 300 and 400 of FIGS. 3A, 3B, and 4.

The memory 520 may further include RTP-based VoLTE call quality metrics 528 and RTP-based handoff criteria 530, which may be loaded into the memory 520 as various aspects of the present disclosure are implemented. For example, RTP-based VoLTE call quality metrics 528 may be received from another computing device (such as a user device 110) via the network interface 506. As a further example, RTP-based handoff criteria 530 may be loaded into the memory 520 from the data store 508 or from an external data store.

In some embodiments, the computing device 500 may include more or fewer components than are shown in FIG. 5. For example, a computing device 500 may include more than one processor 502 or more than one data store 508. In another example, the I/O device interface 504 or the data store 508 may be omitted. In still another example, the VoLTE RTP metric collection module 524 and the RTP-based handoff determination module 526 may include various interdependent or independent subcomponents implementing different aspects of the present disclosure. In some embodiments, two or more computing devices 500 may together form a computer system for executing features of the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A computer-implemented method comprising:
    transmitting, by an enhanced Node B (eNB), a first instruction to a mobile computing device, the first instruction requesting that the mobile computing device begin collecting RTP metrics;
    receiving, by the eNB, a first set of RTP metrics from the mobile computing device, the first set of RTP metrics relating to sequence numbers of individual packets in a first set of packets received by the mobile computing device during a first time interval;
    obtaining, by the eNB, an RTP-based inter-frequency handoff criterion relating to at least one RTP metric in the first set of RTP metrics;
    applying, by the eNB, the RTP-based inter-frequency handoff criterion to at least one metric in the first set of RTP metrics to determine that the RTP-based inter-frequency handoff criterion has been satisfied; and
    transmitting, by the eNB, a second instruction to the mobile computing device, the second instruction requesting that the mobile computing device perform an inter-frequency handoff.

2. The computer-implemented method of claim 1, wherein the first set of RTP metrics includes one or more of a number of RTP packets received out of sequence within the first time interval, or a largest gap between RTP packet sequence numbers within the first time interval.

3. The computer-implemented method of claim 1, wherein the RTP-based inter-frequency handoff criterion comprises a threshold corresponding to one or more of a maximum number of RTP packets received out of sequence, a maximum percentage of RTP packets received out of sequence, or a maximum gap between RTP packet sequence numbers.

4. The computer-implemented method of claim 1 further comprising: receiving, by the eNB, a second set of RTP metrics from the mobile computing device, the second set of RTP metrics corresponding to a second set of packets received by the mobile computing device during a second time interval.

5. The computer-implemented method of claim 4, wherein the first time interval and the second time interval have the same duration.

6. A system comprising:
    a data store configured to store computer-executable instructions; and
    a processor in communication with the data store, wherein the computer-executable instructions, when executed by the processor, configure the processor to:
        cause transmission of a request to a mobile computing device to collect RTP metrics associated with delivery of a wireless telecommunications service via a communication protocol;
        receive, from the mobile computing device, a set of RTP metrics responsive to the transmitted request to collect RTP metrics, the set of RTP metrics including a first RTP metric relating to sequence numbers of individual packets in a first set of packets received by the mobile computing device during a first time interval;
        determine that the set of RTP metrics received from the mobile computing device satisfies an RTP-based inter-frequency handoff criterion relating to the first RTP metric; and
        in response to the determination that the set of RTP metrics satisfies the RTP-based inter-frequency handoff criterion, cause transmission of a request that the mobile computing device perform an inter-frequency handoff.

7. The system of claim 6, wherein the communication protocol comprises one or more of Voice over LTE or Video over LTE.

8. The system of claim 6, wherein the set of RTP metrics further includes a second RTP metric associated with a second set of packets received by the mobile computing device during a second time interval.

9. The system of claim 8, wherein the processor is further configured to calculate a weighted average of the first RTP metric and the second RTP metric, and wherein the determination that the set of RTP metrics satisfies the RTP-based inter-frequency handoff criterion is based at least in part on the weighted average.

10. The system of claim 8, wherein the determination that the set of RTP metrics satisfies the RTP-based inter-frequency handoff criterion is based at least in part on the first RTP metric and the second RTP metric both exceeding a threshold.

11. The system of claim 6, wherein the processor is further configured to determine, based at least in part on the communication protocol used for the delivery of the wireless telecommunications service, that the RTP metrics should be collected.

12. The system of claim 6, wherein the set of RTP metrics comprises one or more of an indication that a number of RTP packets received out of sequence within a specified time interval exceeds a threshold, or a largest gap between RTP packet sequence numbers within the specified time interval exceeds a threshold.

13. The system of claim 6, wherein the processor is further configured to obtain the RTP-based inter-frequency handoff criterion.

14. The system of claim 6, wherein the request causes the mobile computing device to transmit the RTP metrics on a periodic basis.

15. A non-transitory computer-readable medium storing computer-executable instructions that, when executed by a processor, cause the processor to perform operations comprising:
- receiving, from a mobile computing device, RTP metric information based at least in part on protocol-related information contained in a first set of packets received by the mobile computing device via RTP during a first time interval;
- determining that an inter-frequency handoff should be performed based at least in part on applying an RTP-based criterion to the RTP metric information received from the mobile computing device; and
- requesting that the mobile computing device perform an inter-frequency handoff.

16. The non-transitory computer-readable medium of claim 15, the operations further comprising transmitting a request to collect RTP metrics to the mobile computing device.

17. The non-transitory computer-readable medium of claim 15, wherein the RTP metric information comprises an indication that at least a portion of the first set of packets were received out of sequence.

18. The non-transitory computer-readable medium of claim 15, wherein the RTP metric information is a first RTP metric information, and wherein determining that an inter-frequency handoff event should be performed is further based at least in part on a second RTP metric information.

19. The non-transitory computer-readable medium of claim 18, wherein the first RTP metric information and the second RTP metric information are associated with a first time interval.

20. The non-transitory computer-readable medium of claim 18, wherein the first RTP metric information and the second RTP metric information are associated with consecutive time intervals.

* * * * *